US008421780B2

(12) United States Patent
Nakagawa

(10) Patent No.: US 8,421,780 B2
(45) Date of Patent: Apr. 16, 2013

(54) COUNTER CIRCUIT, CONTROL SIGNAL GENERATING CIRCUIT INCLUDING THE COUNTER CIRCUIT, AND DISPLAY APPARATUS

(75) Inventor: Yousuke Nakagawa, Mie (JP)

(73) Assignee: Sharp Kabushiki Kaisha, Osaka (JP)

( * ) Notice: Subject to any disclaimer, the term of this patent is extended or adjusted under 35 U.S.C. 154(b) by 1253 days.

(21) Appl. No.: 12/224,946

(22) PCT Filed: Feb. 20, 2007

(86) PCT No.: PCT/JP2007/053067

§ 371 (c)(1), (2), (4) Date: Sep. 10, 2008

(87) PCT Pub. No.: WO2007/135793

PCT Pub. Date: Nov. 29, 2007

(65) Prior Publication Data

US 2009/0079718 A1 Mar. 26, 2009

(30) Foreign Application Priority Data

May 24, 2006 (JP) ................................ 2006-144714

(51) Int. Cl.
*H04N 5/06* (2006.01)
*G09G 5/00* (2006.01)

(52) U.S. Cl.
USPC ............................ 345/204; 327/291; 348/521

(58) Field of Classification Search .................. 345/204; 377/2, 111; 327/171, 291, 295–298, 141, 327/144
See application file for complete search history.

(56) References Cited

U.S. PATENT DOCUMENTS 4,027,261 A * 5/1977 Laurent et al. .................. 327/98
4,392,159 A * 7/1983 Lemoine et al. .............. 386/201
6,160,433 A * 12/2000 Yamazaki ..................... 327/159
6,466,065 B1 10/2002 Takekawa
2002/0122041 A1 9/2002 Kai et al.
2003/0006813 A1* 1/2003 Ishimi ........................... 327/141
2004/0155691 A1* 8/2004 Ito ................................ 327/291
2005/0083098 A1* 4/2005 Matsui et al. ................ 327/291
2006/0092100 A1* 5/2006 Chou ............................. 345/55

FOREIGN PATENT DOCUMENTS

JP 02-188017 7/1990
JP 03-090873 4/1991
JP 07203310 A * 8/1995
JP 08-184794 7/1996
JP 11-265173 9/1999
JP 2001-136059 5/2001

OTHER PUBLICATIONS

English translation of Japanese Patent Publication No. JP-07203310A.*

* cited by examiner

*Primary Examiner* — Dorothy Harris
(74) *Attorney, Agent, or Firm* — Harness, Dickey & Pierce

(57) ABSTRACT

In a counter circuit of a control signal generating circuit, a selector circuit selects under control which is in accordance with a selector circuit control signal (CTR) a predetermined one in a signal VSYNC and a signal HSYNC, which are pulse signals, so as to input a pulse signal thus selected to a counter. The counter outputs a counted result of pulses of the inputted pulse signal. By use of the counted result, a VSYNC synchronization signal generating circuit or an HSYNC synchronization signal generating circuit generates a control signal to control the driving of image display.

5 Claims, 12 Drawing Sheets

COUNTER CIRCUIT, CONTROL SIGNAL GENERATING CIRCUIT INCLUDING THE COUNTER CIRCUIT, AND DISPLAY APPARATUS

TECHNICAL FIELD

The present invention relates to a counter circuit for generating a control signal that drives an apparatus such as a display apparatus.

BACKGROUND ART

In an active-matrix liquid crystal display apparatus, various control signals, causing a liquid crystal panel to be driven, are generated. These control signals are signals for controlling circuits such as a scanning signal line driving circuit, a data signal line driving circuit, and a power supply circuit. The following describes a general arrangement of such a liquid crystal display apparatus.

FIG. 8 is a block diagram illustrating a liquid crystal display apparatus 31. The liquid crystal display apparatus 31 is arranged so as to include a display panel 32, a control circuit 37, a timing signal generating circuit 38, and a power supply circuit 39. The display panel 32 includes a display section 34 having pixels PIX aligned in a matrix manner, a scanning signal line driving circuit 35, and a data signal line driving circuit 36. The scanning signal line driving circuit 35 and the data signal line driving circuit 36 drive each of the pixels PIX. The scanning signal line driving circuit 35 includes a shift register 35*a*. The data signal line driving circuit 36 includes a shift register 36*a* and a sampling circuit 36*b*.

The display section 34, the scanning signal line driving circuit 35, and the data signal line driving circuit 36 are monolithically formed on a single substrate. This causes labor to be saved during manufacture and wiring capacity to be reduced. In addition, the display section 34, the scanning signal line driving circuit 35, and the data signal line driving circuit 36 are realized by an element such as a polycrystalline silicon thin film transistor formed on a glass substrate. This makes it possible to provide more pixels PIX so as to expand a display area. The polycrystalline silicon thin film transistor is manufactured at a processing temperature of 600° C. or lower so that the glass substrate has no warpage, caused by a process that is carried out at the strain point or higher, even when a general glass substrate having a strain point of 600° C. or lower is used.

The scanning signal line driving circuit 35 and the data signal line driving circuit 36 sequentially write, through the scanning signal lines GL1 through GLm and the data signal lines SD1 through SDk, video signals DAT supplied from the control circuit 37, into areas of the pixels PIX which are formed by causing the display section 34 to be comparted by scanning signal lines GL1 through GLm and data signal lines SD1 through SDk which are intersected with each other. This causes the display section 34 to carry out an image display. Each of the pixels PIX is arranged as illustrated in FIG. 9, for example. In FIG. 9, a pixel PIX, scanning signal line GL and data signal line SD are given an integer "i" that is not more than the integer "k" and an integer "j" that is not more than the integer "m." These integers "i" and "j" represent an address.

Each of the pixels PIX includes a field effect transistor (switching element) SW and a pixel capacitance Cp. The field effect transistor SW has (i) a gate connected to a scanning signal line GL, (ii) a source connected to a data signal line SD, and (iii) a drain connected to one electrode of the pixel capacitance Cp. The other electrode of the pixel capacitance Cp is connected to a common electrode line that is shared by all of the pixels PIX. The pixel capacitance Cp is composed of a liquid crystal capacitance CL, and an auxiliary capacitance Cs which is additionally provided if necessary.

When the scanning signal line GL is selected, the field effect transistor SW is turned on. This causes a voltage applied to the data signal line SD to be applied to the pixel capacitance Cp. While the field effect transistor SW is turned off after a period, during which the scanning signal line GL is selected, elapses, the pixel capacitance Cp holds a voltage applied when the field effect transistor SW is turned off. Transmittance or reflectivity of liquid crystal varies depending on a voltage applied to the liquid crystal capacitance CL. Accordingly, a display state of a pixel PIX can be changed in accordance with a video signal DAT, by selecting a scanning signal line GL and applying to a data signal line SD a voltage which varies in accordance with a video signal DAT.

A video signal DAT to be ultimately supplied to each of the pixels PIX is transmitted from the control circuit 37 to the data signal line driving circuit 36 in a time-shared manner. The data signal line driving circuit 36 extracts, from the video signal DAT, video data to be supplied to each of the pixels PIX, at a timing obtained on the basis of a source clock signal SCK, its inverted signal SCKB, a source start pulse SSP, and its inverted signal SSPB. These signals, supplied from the timing signal generating circuit 38 to the data signal line driving circuit 36, are timing signals. The source clock signal SCK and its inverted signal SCKB each have (i) a predetermined cycle and (ii) a duty ratio of 50% (may have respective duty ratios of not more than 50%). Specifically, the shift resister 36*a* sequentially shifts source start pulses SSP and SSPB in sync with timing at which supplied source clock signals SCK and SCKB become active. This causes output signals S1 through Sk to be generated. The output signals S1 through Sk have respective timings which are different from each other by a half cycle of the source clock signals SCK and SCKB. The sampling circuit 36*b* samples the video signal DAT at the timing indicated by the output signals S1 through Sk, and outputs the video data thus sampled to the data signal lines SD1 through SDk, respectively. A power supply voltage supplied from the power supply circuit 39 to the data signal line driving circuit 36 is used as analog voltages to be supplied to the data signal lines SD1 through SDk.

Similarly, in the scanning signal line driving circuit 35, the shift resister 35*a* sequentially shifts gate start pulses GSP and GSPB in sync with gate clock signals GCK and GCKB, which are supplied from the timing signal generating circuit 38. Accordingly, scanning signals having respective timings which are different from each other by a predetermined period are outputted to the scanning signal lines GL1 through GLm.

The timing signal generating circuit 38 generates timing signals such as the source clock signals SCK and SCKB, the source start pulses SSP and SSPB, the gate clock signals GCK and GCKB, and the gate start pulses GSP and GSPB. Among them, the gate start pulses GSP and GSPB, serving as a kind of display driving control signal, are generated so as to be in sync with a signal HSYNC, which is a horizontal blanking interval synchronization signal supplied from the control circuit 37. In addition, the timing signal generating circuit 38 generates, in sync with a signal VSYNC, power supply control signals, such as a discharge signal DIS, a charge signal CHA, an enable signal EN, for controlling the power supply circuit 39, and then the power supply control signals are supplied to the power supply circuit 39. The signal VSYNC is a vertical blanking interval synchronization signal supplied from the control circuit 37. The discharge signal DIS is a control signal for causing the power supply circuit 39 to discharge its inside at a startup of the power supply circuit 39. The charge signal CHA is a control signal for charging the power supply circuit 39 so that the power supply circuit 39 can prepare for a startup after the power supply circuit 39 is caused to be discharged in response to the discharge signal DIS. The enable signal EN is a control signal for enabling a clock signal that causes the power supply circuit 39 to operate after the power supply circuit 39 is charged in response to the charge signal CHA. The timing signal generating circuit 38 may generate the source start pulses SSP and SSPB in sync with a dot clock signal.

The control circuit 37 generates signals such as a video signal DAT, signals VSYNC and HSYNC, based on a control signal and a video signal that are externally supplied. The liquid crystal display apparatus 31 supplies, via its power supply section, power to the control circuit 37 and the power supply circuit 39. The power supply circuit 39 also supplies power to the scanning signal line driving circuit 35, a common voltage of the display section 34, and the like, in addition to the power to be supplied to the data signal lines SD1 through SDk, as described above.

The above has schematically described the arrangement of the liquid crystal display apparatus 31. The following describes an arrangement of the timing signal generating circuit 38 in detail.

As illustrated in FIG. 10, a conventional timing signal generating circuit 38 separately includes (i) a VSYNC synchronous counter 41 for generating a signal being in sync with a signal VSYNC and (ii) an HSYNC synchronous counter 42 for generating a signal being in sync with a signal HSYNC. The pulse signals VSYNC and HSYNC are input pulse signals to be supplied to the respective synchronous counters. The input pulse signals VSYNC and HSYNC are counted by the synchronous counters, and are also synchronization signals to be simultaneously supplied to clock terminals of flip-flops of the synchronous counters, respectively. Based on a counted result made by the VSYNC synchronous counter 41, a VSYNC synchronization control signal generating circuit 43 generates various control signals being in sync with a signal VSYNC. Likewise, based on a counted result made by the HSYNC synchronous counter 42, an HSYNC synchronization control signal generating circuit 44 generates various control signals being in sync with a signal HSYNC.

FIG. 11 is a timing diagram illustrating a relation between the signals VSYNC and HSYNC and the control signals generated based on the results of counting the signals VSYNC and HSYNC.

FIG. 11 shows early signals in a power-up period and in a subsequent display period. The power-up period ends at the time when the VSYNC synchronous counter 41 counts 8 pulses of the signal VSYNC. Then, a display period begins. During a power-up period, generated are power supply control signals being in sync with the signal VSYNC. For example, when a rising edge of the second pulse of the signal VSYNC is counted, a discharge signal DIS is generated. When a rising edge of the third pulse of the signal VSYNC is counted, a charge signal CHA is generated. When a rising edge of the fifth pulse of the signal VSYNC is counted, an enable signal EN is generated. In FIG. 11, a discharge signal DIS and a charge signal CHA have the same pulse width corresponding to two cycles of the signal VSYNC. An enable signal EN remains active from its rising edge to the end of a display period. During a display period, generated is a display driving control signal being in sync with a signal HSYNC. For example, a gate start pulse GSP is generated when the HSYNC synchronous counter 42 counts the (N−1)th falling edge ($N \leqq 7$) of a pulse signal HSYNC after a falling edge of a pulse signal VSYNC. A gate start pulse GSP has a pulse width corresponding to one cycle of a signal HSYNC, and falls in sync with the N-th falling edge of the pulse signal HSYNC.

[Patent Document 1]

Japanese Unexamined Patent Publication No. 90873/1991 (Tokukaihei 3-90873 (Date of publication: Apr. 16, 1991))

DISCLOSURE OF INVENTION

The conventional timing signal generating circuit 38 separately includes two synchronous counters for VSYNC synchronization and for HSYNC synchronization. Note however that many synchronous counters are required for realizing the timing signal generating circuit 38. This causes a problem that the timing signal generating circuit 38 necessitates a large circuit size. This problem is undesirable because the layout of the display panel 32 in the liquid crystal display apparatus 31 is greatly constrained.

In order to provide a timing generation device of a small circuit size, Patent Document 1 discloses an arrangement in which a timing pulse and an edge pulse of various timing are generated with the use of an n-bit counter that is shared by a timing pulse generator 10 and an edge pulse generator 50. The timing pulse, which is used in an IC tester, defines a reference cycle that is used to define a timing when to switch over signals of each pin of an IC to be tested.

In order that the problem that the timing signal generating circuit 38 has a large circuit size is solved, it may be conceivable to apply the technique taught by Patent Document 1 as illustrated in FIG. 12. Specifically, an HSYNC synchronous counter 45 is shared by a VSYNC synchronization control signal generating circuit 46 and an HSYNC synchronization control signal generating circuit 47.

However, such an arrangement illustrated in FIG. 12 requires the HSYNC synchronous counter 45 to count too many pulses of a signal HSYNC, for example, 400 pulses for one pulse of a signal VSYNC, as shown in the timing diagram of FIG. 11. This causes an increase in the number of bits of the HSYNC synchronous counter 45. In other words, the number of internal flip-flops increases, and therefore, the HSYNC synchronous counter 45 should have a large circuit size. For example, the VSYNC synchronous counter 41 and the HSYNC synchronous counter 42 illustrated in FIG. 10 each can be realized by a 3-bit synchronous counter, whereas the HSYNC synchronous counter illustrated in FIG. 12 is realized by a synchronous counter having many bits of no less than 11-bit. Thus, the timing signal generating circuit 38, which generates control signals, still has a large circuit size, even if the HSYNC synchronous counter 45 is shared by the VSYNC synchronization control signal generating circuit 46 and the HSYNC synchronization control signal generating circuit 47.

In view of the problem above, the present invention is made, and its object is to realize (i) a counter circuit that allows a circuit for generating a signal based on an output of a counter to have a sufficiently small circuit size, (ii) a control signal generating circuit having the counter circuit, and (iii) a display apparatus.

A counter circuit of the present invention includes: a counter; and a selector circuit for selecting a pulse signal, which is to be supplied to the counter, from among a plurality of pulse signals.

According to the invention, the selector circuit selects, from among a plurality of pulse signals, a pulse signal which is to be supplied to the counter. As such, a single counter can be shared by the plurality of pulse signals. This prevents an increase in the number of bits of the counter. This allows a reduction in circuit size of a circuit when the circuit is configured so as to (i) include the counter and (ii) generate a signal with the use of an output signal of the counter.

As a result, it is possible to ensure the effect of realizing a counter circuit that allows a circuit for generating a signal based on an output of a counter to have a sufficiently small circuit size.

Additional objects, features, and strengths of the present invention will be made clear by the description below. Further, the advantages of the present invention will be evident from the following explanation in reference to the drawings.

EXPLANATION OF LETTERS AND NUMERALS

1 Counter circuit
2 Control signal generating circuit
3 Selector circuit
4 Counter
5 VSYNC synchronization signal generating circuit (circuit for generating control signal)
6 HSYNC synchronization signal generating circuit (circuit for generating control signal)
21 Liquid crystal display apparatus (display apparatus)
28 Timing signal generating circuit
VSYNC/HSYNC Signals (input pulses; pulse signals)

BEST MODE FOR CARRYING OUT THE INVENTION

The following describes an embodiment of the present invention with reference to FIGS. 1 through 7.

Figure 7:
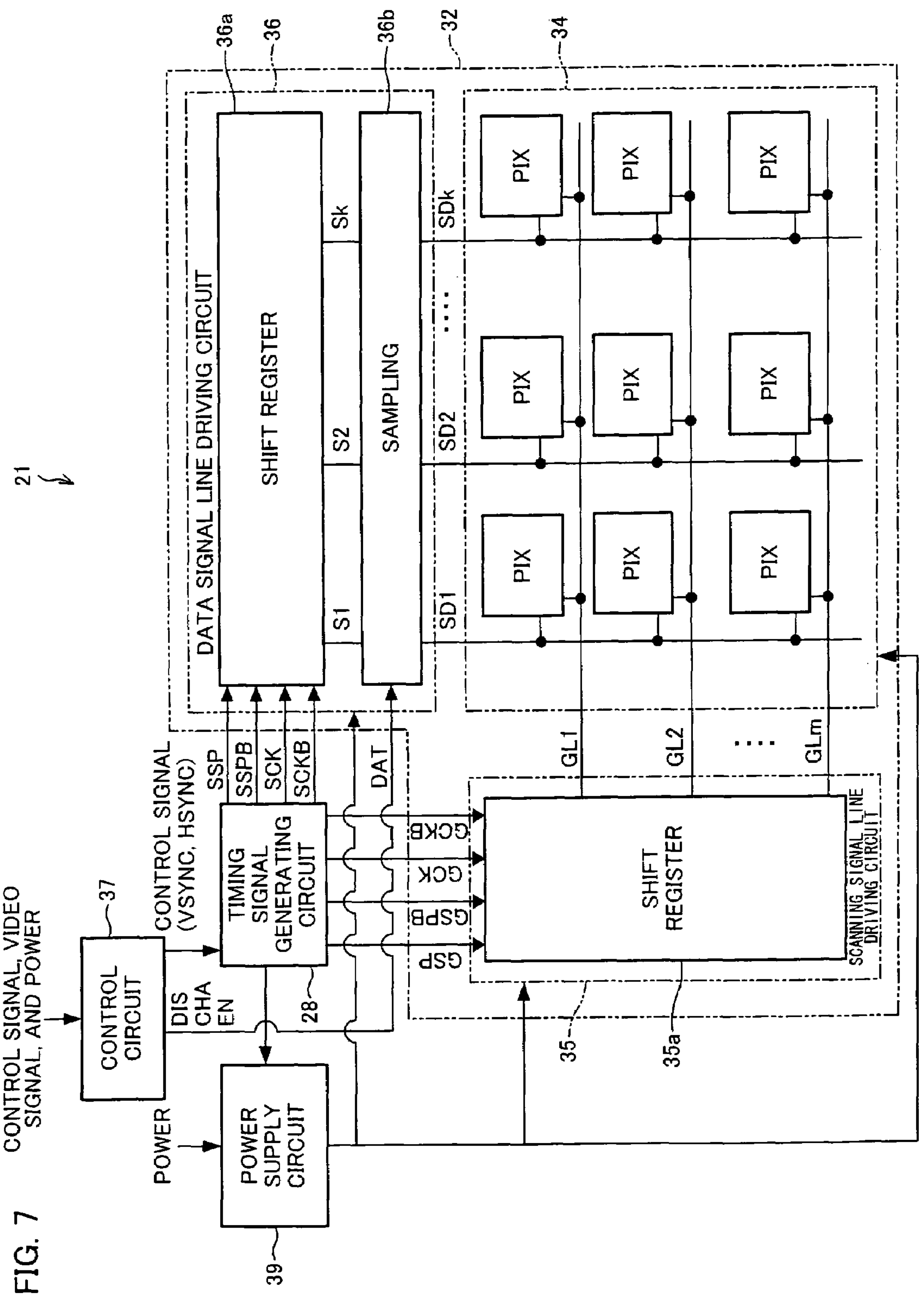
FIG. 7 is a block diagram of the embodiment of the present invention, illustrating an arrangement of a display apparatus.
Figure 8:
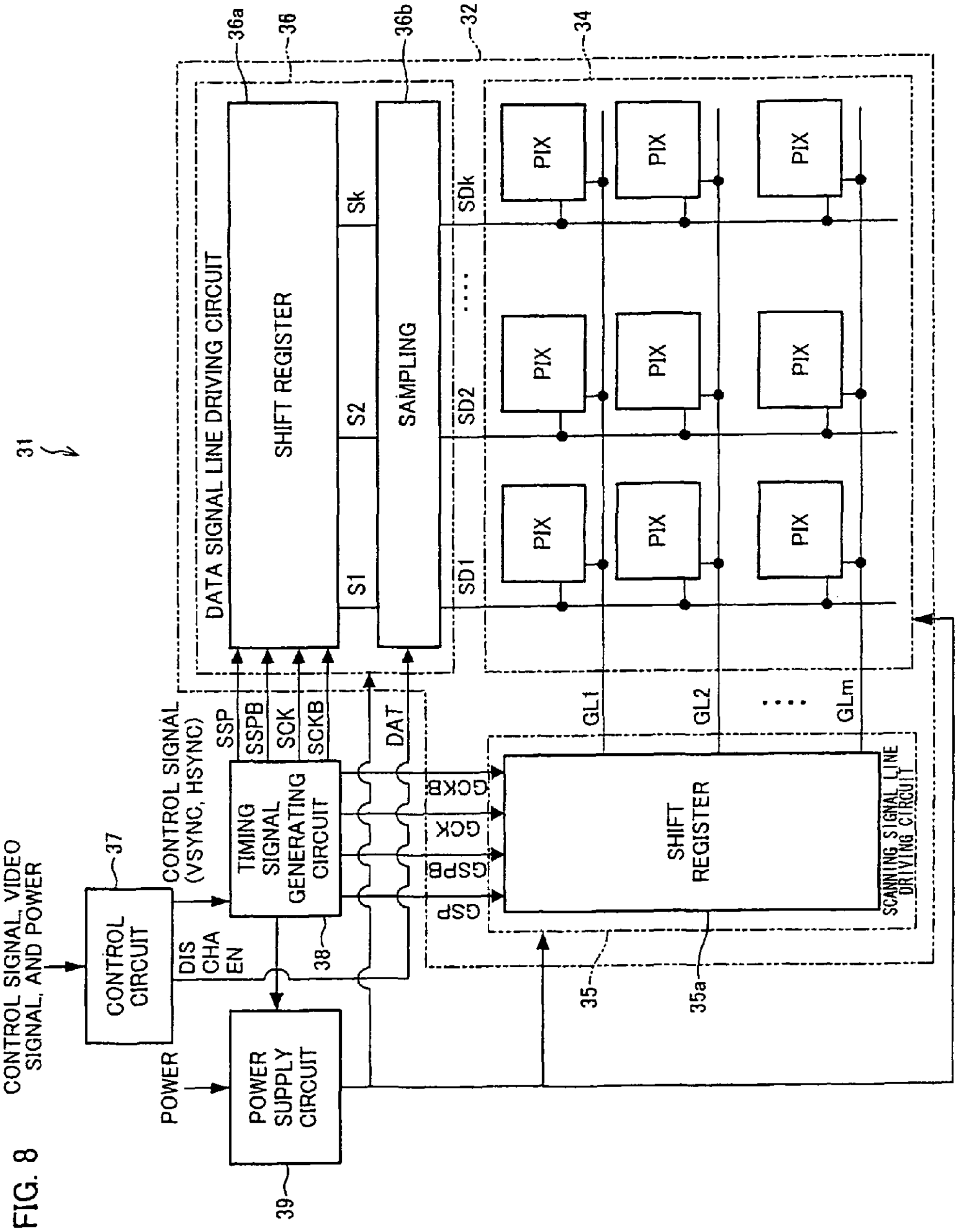
FIG. 8 is a block diagram of a conventional art, illustrating an arrangement of a display apparatus.
Figure 9:
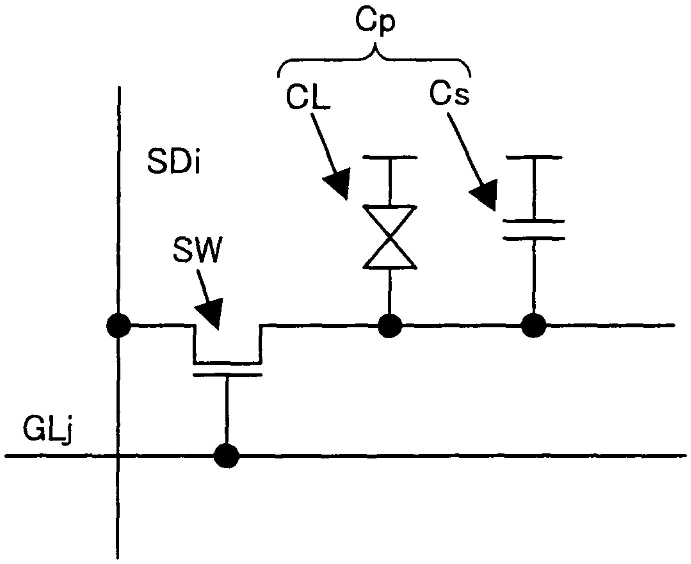
FIG. 9 is a circuit diagram illustrating an arrangement of pixel of a display apparatus.

FIG. 7 illustrates an arrangement of a liquid crystal display apparatus 21 of the present embodiment. The liquid crystal display apparatus 21 is realized by replacing a timing signal generating circuit 38 in a liquid crystal display apparatus 31 illustrated in FIG. 8 with a timing signal generating circuit 28. A counter circuit of the present embodiment is included in the timing signal generating circuit 28. The counter circuit is realized by replacing, in the timing signal generating circuit 38 of the liquid crystal display apparatus 31 illustrated in FIG. 8, either conventional counter circuit illustrated in FIG. 10 or FIG. 12 with a counter circuit 1 illustrated in FIG. 1. In the present embodiment, a counter provided in the counter circuit 1 is a synchronous counter. However, an asynchronous counter may be alternatively adopted.

Figure 1:
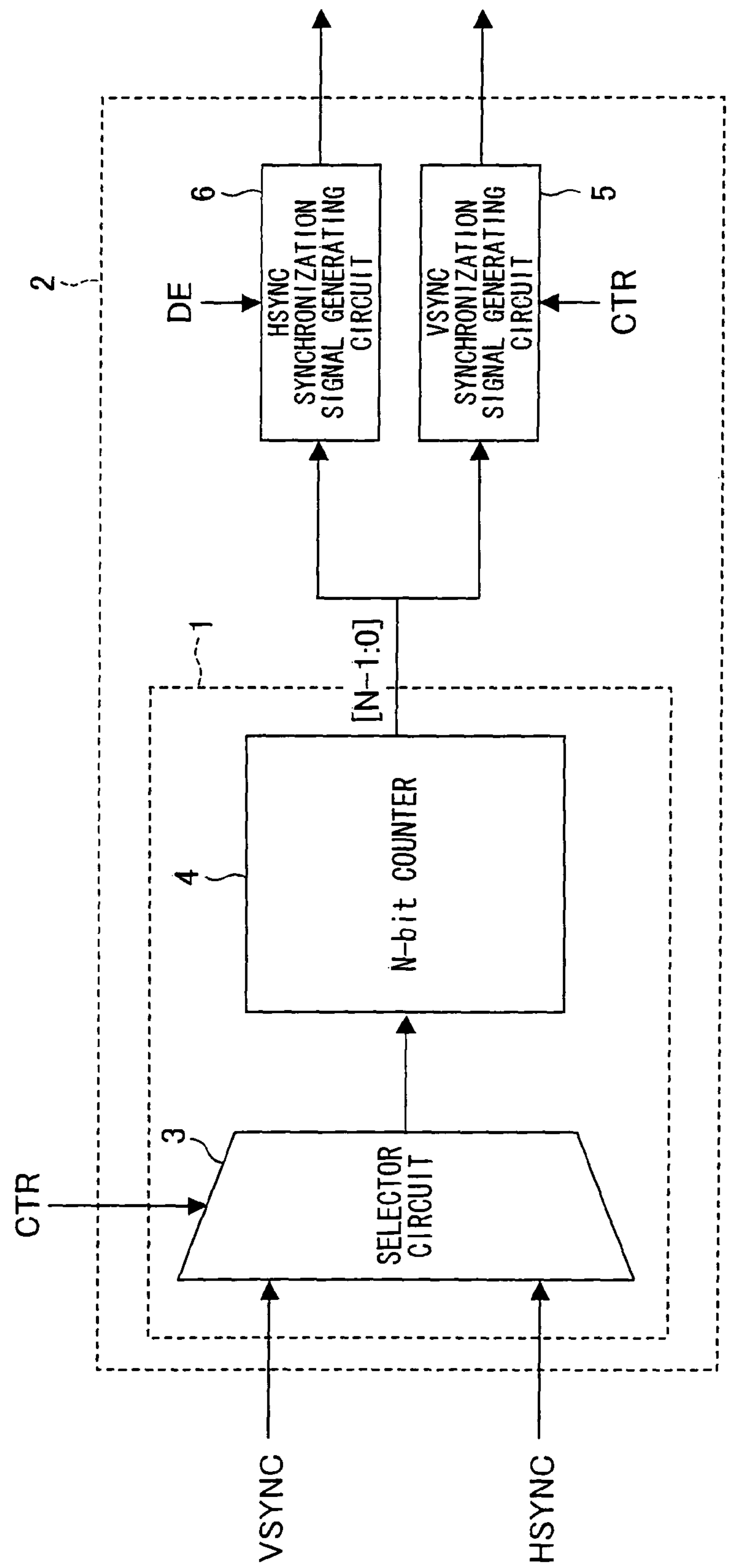
FIG. 1 is a block diagram of an embodiment of the present invention, illustrating an arrangement of substantial parts of a counter circuit and a control signal generating circuit.

The counter circuit 1 illustrated in FIG. 1 includes a selector circuit 3 and a counter 4. A control signal generating circuit 2 is arranged so as to include the counter circuit 1, a VSYNC synchronization signal generating circuit (circuit for generating a control signal) 5, and an HSYNC synchronization signal generating circuit (circuit for generating a control signal) 6. The control signal generating circuit 2 causing the liquid crystal display apparatus 21 to be driven and controlled for an image display, in accordance with an output of the counter 4.

Figure 2:
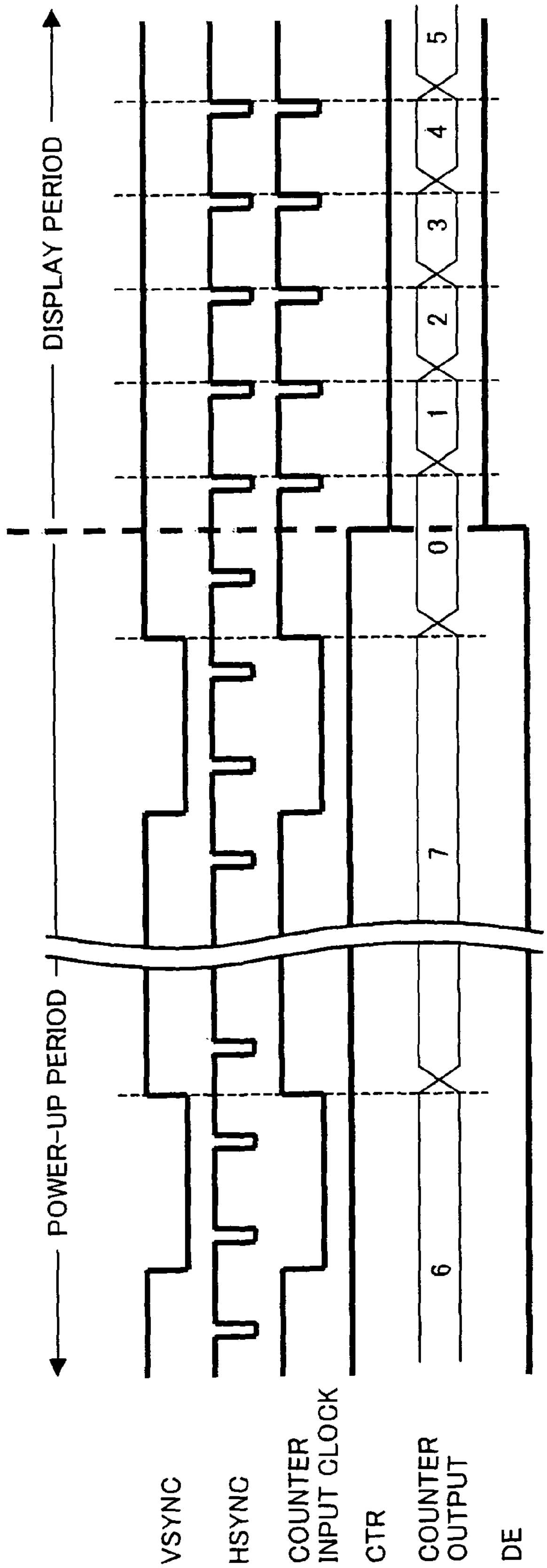
FIG. 2 is a timing diagram illustrating an operation of the counter circuit illustrated in FIG. 1.

The selector circuit 3 selects either a pulse signal VSYNC or a pulse signal HSYNC, both of which are input signals, so as to supply a selected signal to the counter 4. In FIG. 1, the selector circuit 3 is symbolically illustrated. The present embodiment is not limited to a specific selection method for selector circuit 3. The number of input signals to the selector circuit 3 is not limited to two, but may generally be any plural number. The pulse signals VSYNC and HSYNC are the same as those described in Background Art. FIG. 2 shows their respective waveforms. In the pulse signal VSYNC, a High level and a Low level are alternated cyclically during a power-up period of the liquid crystal display apparatus 21. During a display period, the pulse signal VSYNC is fixed to the High level. In the pulse signal HSYNC, a High level and a Low level are alternated cyclically during both a power-up period and a display period of the liquid crystal display apparatus 21.

Whether the selector circuit 3 selects and outputs a signal VSYNC or a signal HSYNC is controlled in accordance with a supplied selector circuit control signal CTR. A signal, generated by the control circuit 37 illustrated in FIG. 7 and supplied to the timing signal generating circuit 28, for example, can be used as a selector circuit control signal CTR. As is shown in FIG. 2, a selector circuit control signal CTR has a High level during a power-up period and a Low level during a display period. When the selector circuit control signal CTR has a High level, the selector circuit 3 selects and outputs a pulse signal VSYNC whereas, when a selector circuit control signal CTR has a Low level, the selector circuit 3 selects and outputs a pulse signal HSYNC. A pulse signal outputted from the selector circuit 3 is supplied to the counter 4. In this embodiment, since a selector circuit control signal CTR has a High level during a power-up period and a Low level during a display period, the selector circuit 3 selects and outputs a pulse signal VSYNC during a power-up period, whereas the selector circuit 3 selects and outputs a pulse signal HSYNC during a display period.

An N-bit synchronous counter is adopted as the counter 4 in the present embodiment. The counter 4 counts the pulse number of a pulse signal supplied from the selector circuit 3. In the counter 4, the pulse signal serves as an input signal, and a synchronization signal to be supplied to clock terminals of internal flip-flops. As is shown in FIG. 2, the counter 4 counts the pulse number of a pulse signal VSYNC during a power-up period, whereas the counter 4 counts the pulse number of a pulse signal HSYNC, during a display period. As is indicated by "[N−1:0]" in FIG. 1, all output signals for respective bits can be adopted as output signals of the counter 4. However, it is sufficient that only output signals, which are used in the circuits by which the counter 4 is followed, are extracted from all of the output signals.

The VSYNC synchronization signal generating circuit 5 is a circuit for generating a control signal being in sync with a pulse signal VSYNC with the use of an output signal which the counter 4 outputs when the counter 4 counts the pulse number of the pulse signal VSYNC. The VSYNC synchronization signal generating circuit 5 generates a control signal based on an output signal of the counter 4. As such, the VSYNC synchronization signal generating circuit 5 uses, as its control signal, a selector circuit control signal CTR used in the selector circuit 3, and operates to generate a control signal during a power-up period in which the selector circuit control signal CTR has a High level.

The HSYNC synchronization signal generating circuit 6 is a circuit for generating a control signal being in sync with a pulse signal HSYNC with the use of an output signal which the counter 4 outputs when the counter 4 counts the pulse number of the pulse signal HSYNC. The HSYNC synchronization signal generating circuit 6 generates a control signal based on an output signal of the counter 4. As such, the HSYNC synchronization signal generating circuit 6 uses, as its control signal, a display enable signal DE which is indicative of a display period, and operates to generate a control signal during a display period. As is shown in FIG. 2, a display enable signal DE has a Low level during a power-up period and a High level during a display period.

Figure 11:
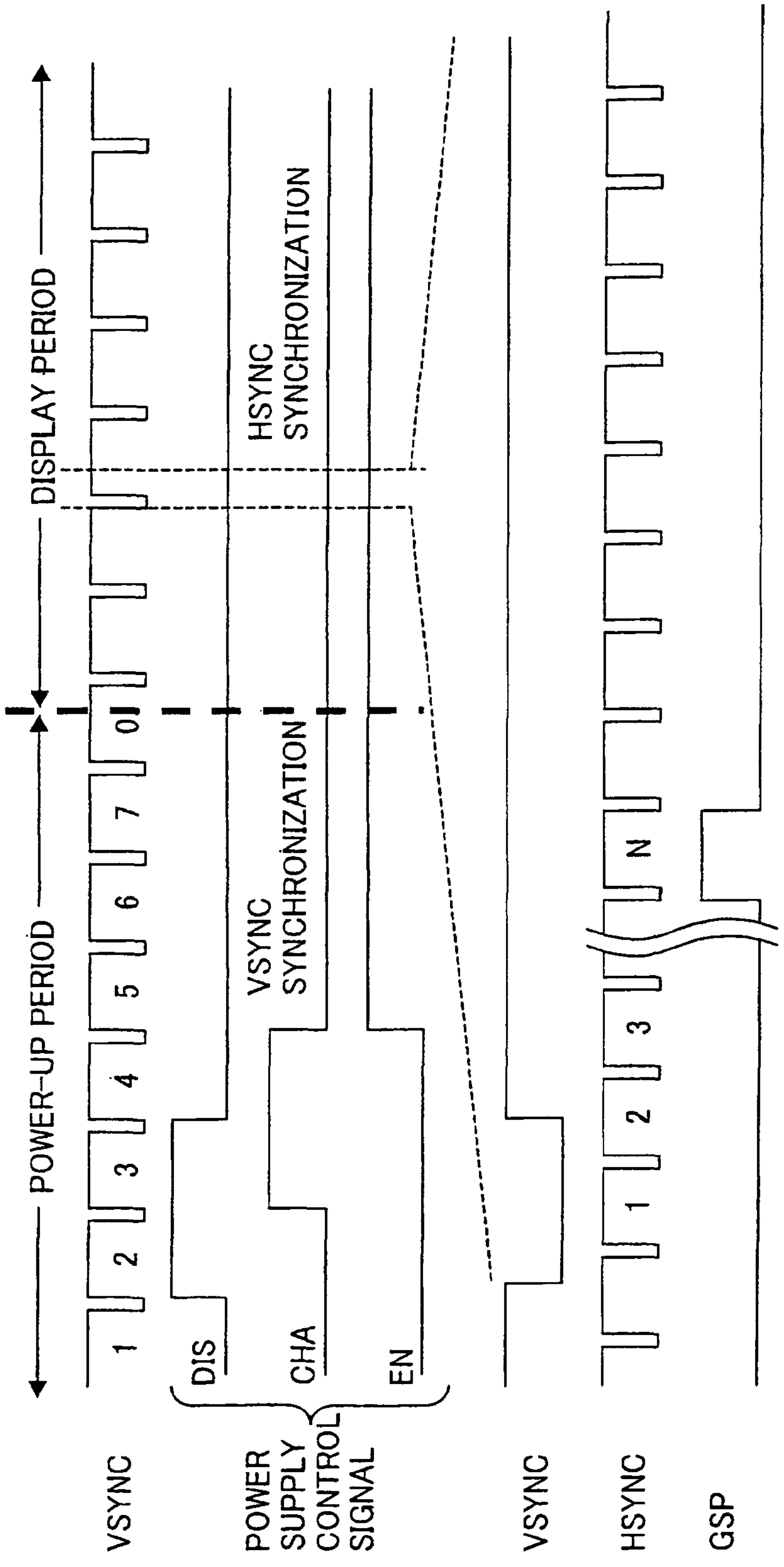
FIG. 11 is a timing diagram illustrating an operation of the counter circuit illustrated in FIG. 10.

With the arrangement of the counter circuit 1 and the control signal generating circuit 2, since the counter 4 is shared by pulse signals VSYNC and HSYNC, it is possible to generate, during a power-up period, power supply control signals (control signals) such as a discharge signal DIS, a charge signal CHA, and an enable signal EN which are described in Background Art with reference to FIG. 11, whereas it is possible to generate, during a display period, display driving control signals (control signals) such as a gate start pulse GSP which are also illustrated in FIG. 11. It should be noted that, with the use of a dot clock signal as an input signal to the selector circuit 3, a source start pulse can be also generated as a display driving control signal (control signal) based on an output signal of the counter 4, although this is not illustrated in FIG. 1.

Thus, in the liquid crystal display apparatus 21 of the present embodiment, the selector circuit 3 selects, from among a plurality of pulse signals, a pulse signal which is to be supplied to the counter 4. As such, a single counter 4 can be shared by the plurality of pulse signals. This prevents an increase in the number of bits of the counter 4. For example, the conventional counter circuit illustrated in FIG. 12 requires an 11-bit counter, whereas the counter circuit 1 of the present embodiment merely requires a 3-bit counter, namely, the counter 4. This allows a reduction in circuit size of a circuit when the circuit is configured so as to (i) include a counter 4 and (ii) generate a signal with the use of an output signal of the counter 4.

As a result, it is possible to realize a counter circuit that allows a full reduction in size of a circuit for generating a signal with the use of an output signal of a counter.

Especially, in the liquid crystal display apparatus 21, a plurality of pulse signals to be supplied to the counter 4 includes a pulse signal VSYNC having a vertical cycle for image display and a pulse signal HSYNC having a horizontal cycle for image display. According to this arrangement, the counter 4 is shared by the pulse signals VSYNC and HSYNC for generating control signals for controlling the driving of the liquid crystal display apparatus 21. A vertical cycle is much longer than a horizontal cycle. When it is intended to generate (i) a control signal which is in sync with a signal having a vertical cycle and (ii) a control signal which is in sync with a signal having a horizontal cycle, based on a counted result which is obtained when a single counter counts a single input pulse signal, i.e., only the signal having the horizontal cycle, a counter having great many bits for counting vertical cycles is necessary. In contrast, in the present embodiment, an input pulse signal is divided into a signal having a vertical cycle for image display and a signal having a horizontal cycle for image display. This especially gives rise to the effect of avoiding an increase in the number of bits of the counter 4.

Furthermore, the control signal generating circuit 2 includes the counter circuit 1. This allows a reduction in size of the control signal generating circuit 2. Moreover, the liquid crystal display apparatus 21 includes the control signal generating circuit 2. This allows a space other than the control signal generating circuit 2 to be largely secured.

The following description deals with a concrete example having effect of reducing an area of the circuit in a case where control signals, having the respective timings illustrated in FIG. 11, are generated. It is assumed that the same VSYNC and HSYNC synchronization control signal generating circuits are used in the present embodiment and in the conventional arts.

Figure 10:
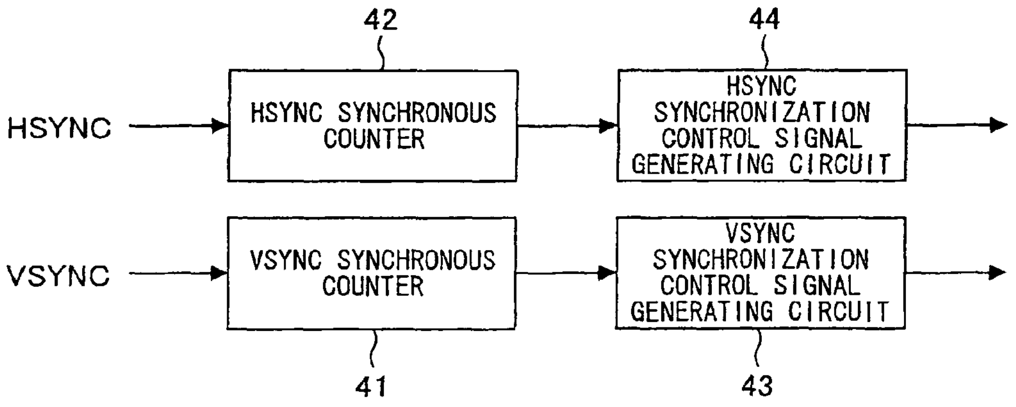
FIG. 10 is a block diagram of the conventional art, illustrating the first arrangement of a counter circuit.

In the counter circuit illustrated in FIG. 10, which was described as the first conventional art, each of a VSYNC synchronous counter 41 and an HSYNC synchronous counter 42 can be realized by a 3-bit counter. Since trigger pulse signals are generated based on output signals of the counters, it is necessary to separately provide trigger pulse generating circuits for the counters, respectively. It follows that the counter circuit should two 3-bit counters and two trigger pulse generating circuits. As a result, the area of the counter circuit becomes no less than 10% of the total area of the control circuit 37 and the timing signal generating circuit 38 of the liquid crystal display apparatus 31 illustrated in FIG. 8.

Figure 12:
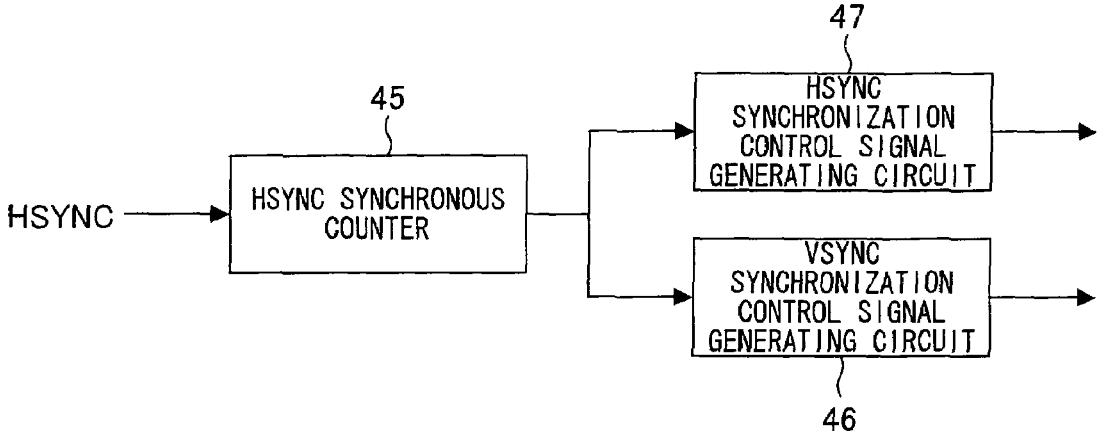
FIG. 12 is a block diagram of the conventional art, illustrating the second arrangement of the counter circuit.

In the counter circuit illustrated in FIG. 12, which was described as the second conventional art, a single HSYNC synchronous counter 45 is provided. This HSYNC synchronous counter 45 is realized by an 11-bit counter. Since a trigger pulse signal is generated based on an output signal of the counter, it is necessary to separately provide a single trigger pulse generating circuit. The area of an 11-bit counter is approximately six times as large as that of a 3-bit counter. In this case, it is clear that the counter circuit also has an enormous area.

Figure 5:
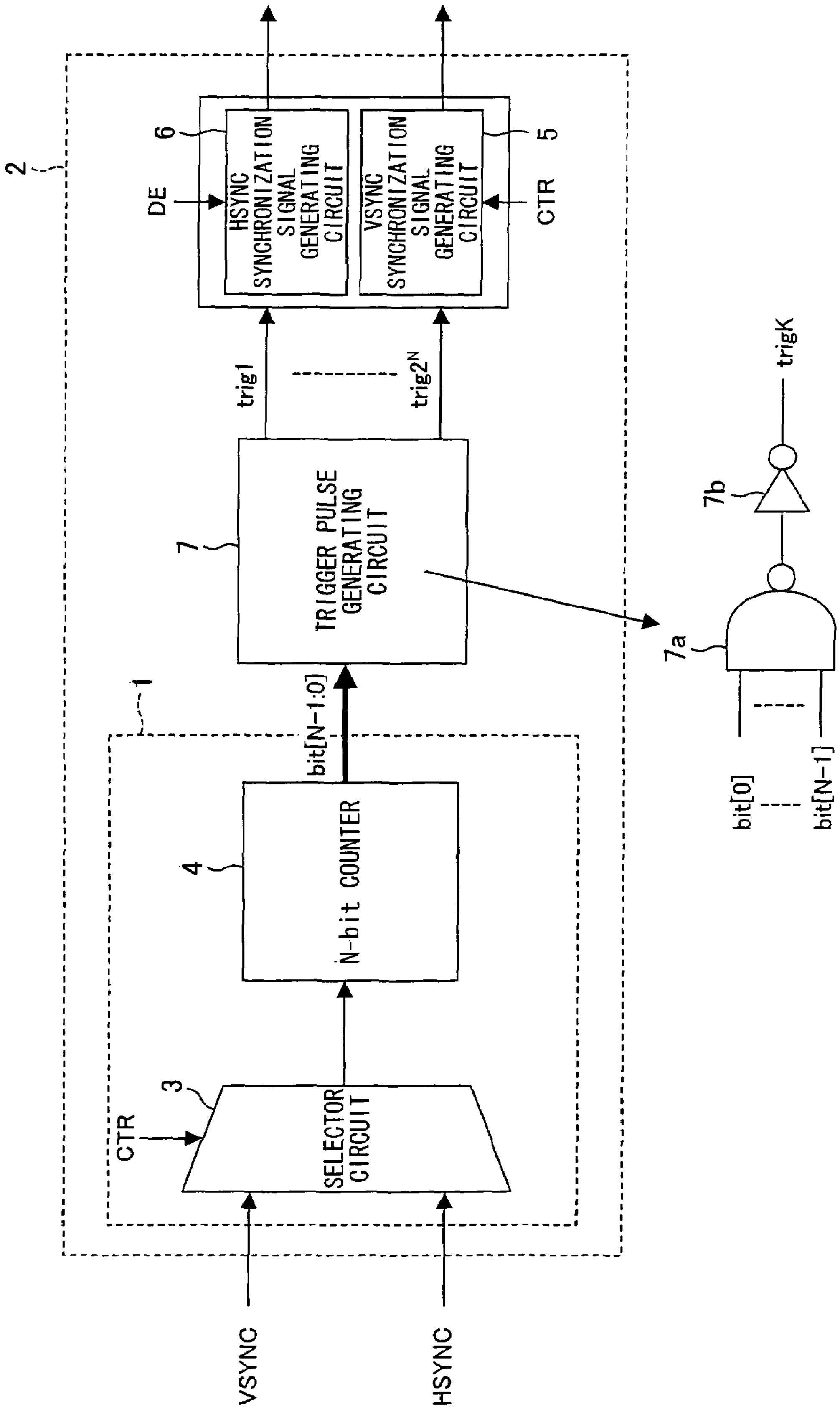
FIG. 5 is a block diagram illustrating an arrangement of a modification of the control signal generating circuit illustrated in FIG. 1.

On the other hand, as is clear from FIG. 5, a counter circuit 1 of the present embodiment requires one selector circuit 3, a counter 4 that can be realized by a 3-bit counter, and one trigger pulse generating circuit 7 required for generating a trigger pulse signal. The total area of the selector circuit 3, the counter 4, and the trigger pulse generating circuit 7 is no more than 5% of the total area of the control circuit 37 and the timing signal generating circuit 28 of the liquid crystal display apparatus 21 illustrated in FIG. 7.

The following describes a concrete example of a selector circuit 3 provided in the counter circuit 1 and in the control signal generating circuit 2 that are arranged as above.

Figure 3:
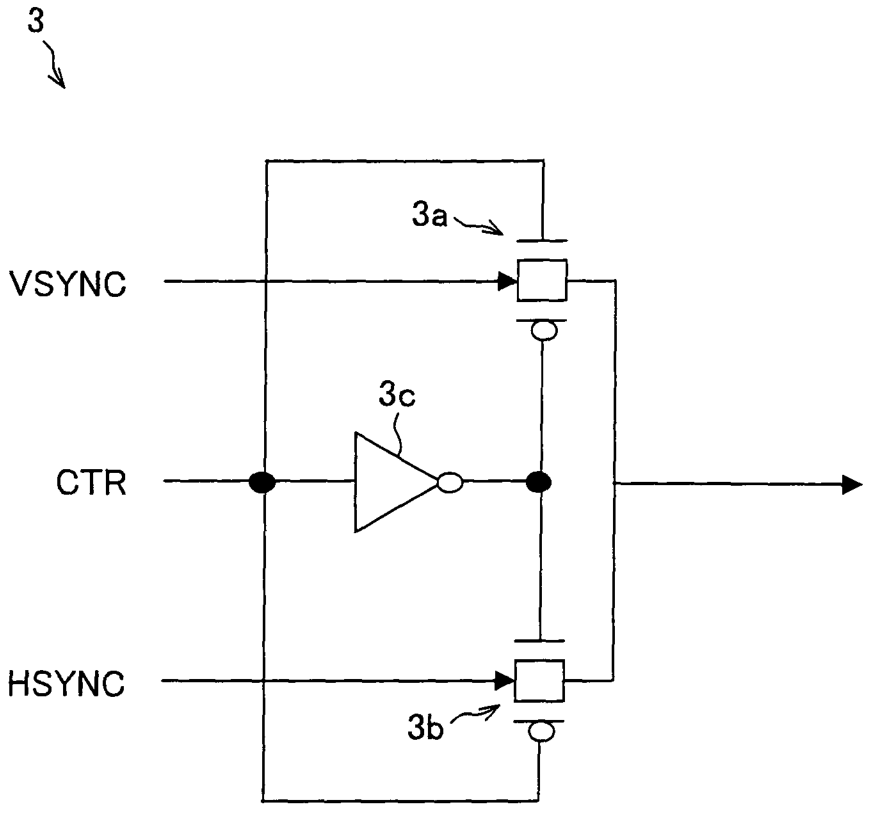
FIG. 3 is a circuit diagram illustrating the first concrete example of a selector circuit provided in the counter circuit illustrated in FIG. 1.

FIG. 3 is an example in which the selector circuit 3 is realized by a switching circuit. The selector circuit 3 is an example of a two-input selector circuit. The selector circuit 3 includes two CMOS analog switches 3*a* and 3*b*, and one inverter 3*c*. The analog switch 3*a* is a switch for switching on or off the inputting of a pulse signal VSYNC into the counter 4. The analog switch 3*b* is a switch for switching on or off the inputting of a pulse signal HSYNC into the counter 4.

The analog switches 3*a* and 3*b* are controlled to be switched on or off in response to a selector circuit control signal CTR having a logical level of High or Low. A selector circuit control signal CTR is supplied, as it is, to each gate of an n-channel MOS transistor of the analog switch 3*a* and a p-channel MOS transistor of the analog switch 3*b*. The selector circuit control signal CTR is logically inverted by the inverter 3*c* so as to be supplied to each gate of a p-channel MOS transistor of the analog switch 3*a* and an n-channel MOS transistor of the analog switch 3*b*. Thus, the selector circuit 3 selects and outputs a pulse signal VSYNC since the analog switch 3*a* is switched on and the analog switch 3*b* is switched off when a selector circuit control signal CTR has a High level, whereas the selector circuit 3 selects and outputs a pulse signal HSYNC since the analog switch 3*a* is switched off and the analog switch 3*b* is switched on when the selector circuit control signal CTR has a Low level.

Figure 4:
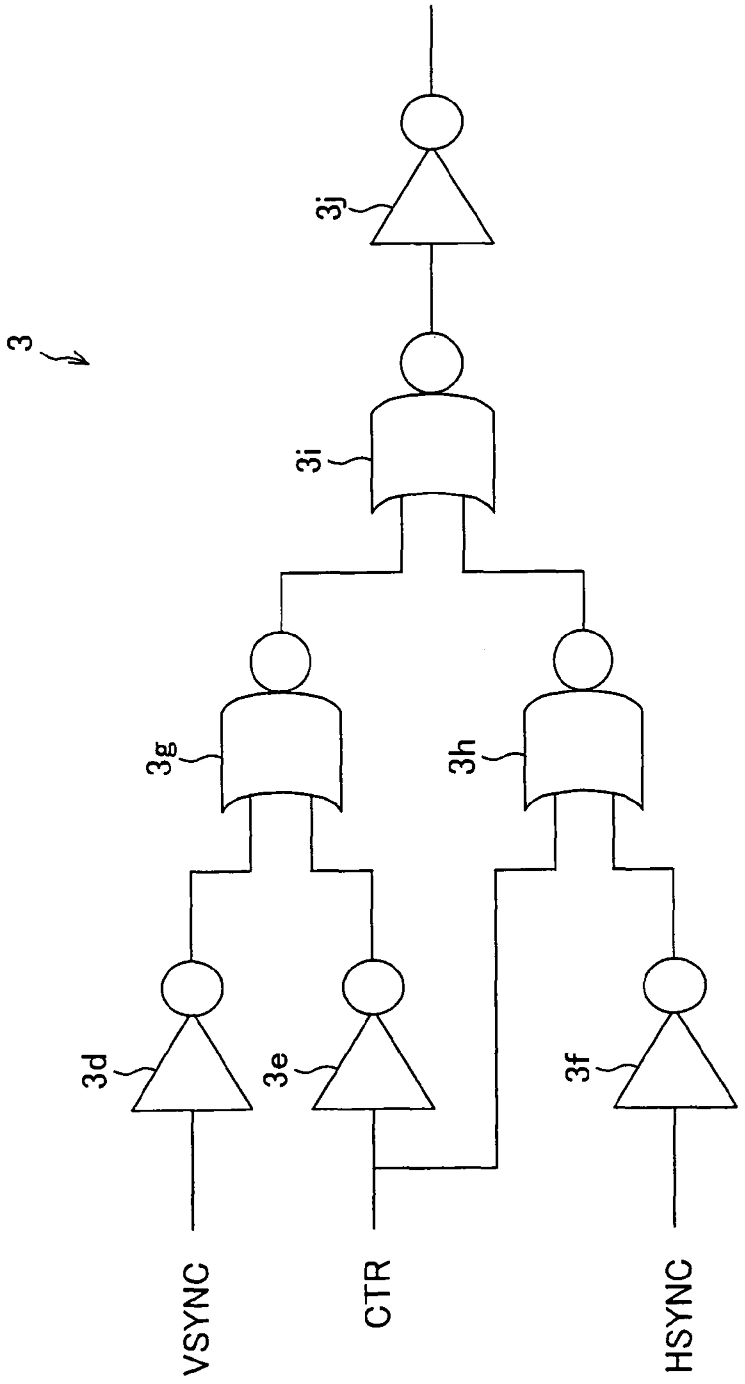
FIG. 4 is a circuit diagram illustrating the second concrete example of the selector circuit provided in the counter circuit illustrated in FIG. 1.

FIG. 4 illustrates an example of a counter circuit 3 that is realized by a logical circuit. The counter circuit 3 is an example of a two-input counter circuit. The counter circuit 3 includes inverters 3*d*, 3*e*, 3*f*, and 3*j*, and two-input NOR circuits 3*g*, 3*h*, and 3*i*. A pulse signal VSYNC is supplied to the inverter 3*d*. A selector circuit control signal CTR is supplied to the inverter 3*e*. A pulse signal HSYNC is supplied to the inverter 3*f*. Output signals of the inverter 3*d* and the inverter 3*e* are supplied to the NOR circuit 3*g*. An output signal of the inverter 3*f* and a selector circuit control signal CTR are supplied to the NOR circuit 3*h*. Output signals of the NOR circuit 3*g* and the NOR circuit 3*h* are supplied to the NOR circuit 3*i*. An output signal of the NOR circuit 3*i* is supplied to the inverter 3*j*. An output signal of the inverter 3*j* is an output signal of the selector circuit 3. Accordingly, the selector circuit 3 outputs a pulse signal VSYNC during a power-up period in which a selector circuit control signal CTR has a High level whereas the selector circuit 3 outputs a pulse signal HSYNC during a display period in which a selector circuit control signal CTR has a Low level.

FIG. 5 illustrates an arrangement in which the control signal generating circuit 2 includes a circuit for generating a trigger pulse signal for generating control signals based on an output signal of the counter 4. FIG. 5 shows a trigger pulse generating circuit 7 that generates a trigger pulse in response to an output signal of the counter 4. All output signals of bits of the counter 4 can be an input signal to the trigger pulse generating circuit 7. A state, in which input signals of bit[0] through bit[N−1] are supplied to the trigger pulse generating circuit 7, is illustrated underneath FIG. 5. These input signals serve as input signals to a NAND circuit 7*a* in the trigger pulse generating circuit 7. An output signal of the NAND circuit 7*a* is made into a trigger pulse [trigK], via an inverter 7*b*. In a case where all the outputs bit[0] through bit[N−1] of the counter 4 are used, the number of possible varieties of trigger pulses trigK is $2^N$(trig1 through trig$2^N$). However, out of the possible varieties, only predetermined trigger pulses trigK are sufficiently used for the generation of the control signals. Accordingly, only predetermined outputs out of bit[0]~bit[N−1] are taken as an output of the counter 4. In the trigger pulse generating circuit 7 illustrated in FIG. 5, an output signal of the NAND circuit 7*a* becomes a Low level only when all of the predetermined output signals out of bit[0]~bit[N−1] have a High level. This causes a trigger pulse trigK to be outputted.

Figure 6:
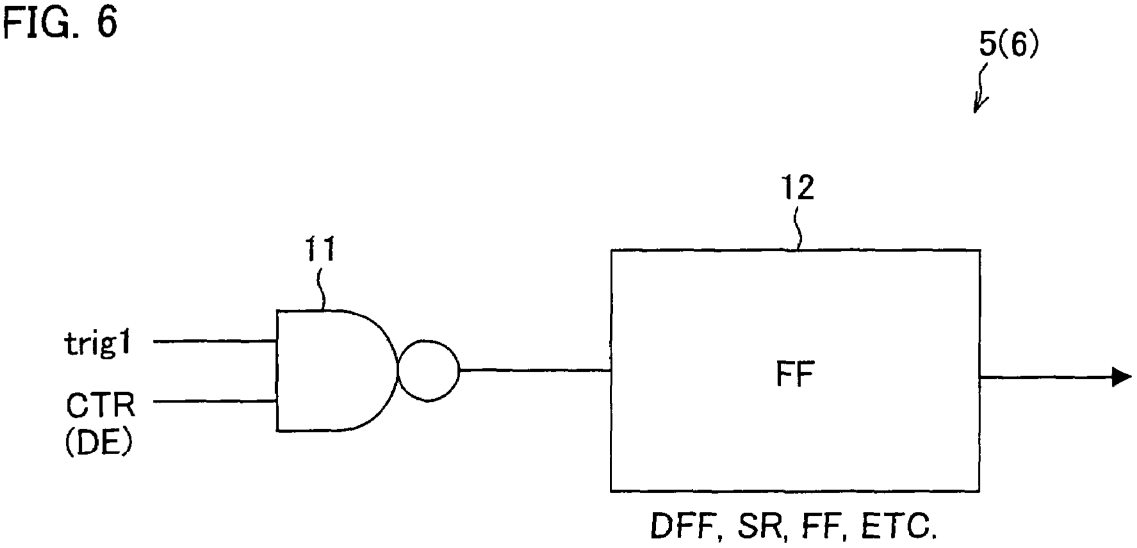
FIG. 6 is a circuit diagram illustrating an arrangement for generating based on a trigger pulse illustrated in FIG. 5 a control signal.

FIG. 6 illustrates an example of the VSYNC synchronization signal generating circuit 5 and the HSYNC synchronization signal generating circuit 6, which generate control signals based on an output signal of the trigger pulse generating circuit 7 illustrated in FIG. 5. In the example of FIG. 6, a NAND circuit 11 and a flip-flop 12 are provided. The NAND circuit 11 is a two-input NAND circuit. A trigger pulse trig1, which is supplied from the trigger pulse generating circuit 7, is supplied to one of the two input terminals of the NAND circuit 11. In a case where the VSYNC synchronization signal generating circuit 5 is used, a selector circuit control signal CTR is supplied to the other of the two input terminals. Alternatively, in a case where the HSYNC synchronization signal generating circuit 6 is used, a display enable signal DE is supplied to the other input terminal. With the arrangement, an output signal of the NAND circuit 11 has a Low level in response to every supplied trigger pulse trig1, (i) while a selector circuit control signal CTR has a High level during a power-up period or (ii) while a display enable signal DE has a High level during a display period. This allows the VSYNC synchronization signal generating circuit 5 and the HSYNC synchronization signal generating circuit 6 to operate in a desired period, in response to such an output signal having a Low level (serving as an active signal). An output signal of the NAND circuit 11 is supplied to the flip-flop 12. A flip-flop such as a D flip-flop or a set-reset flip-flop can be used as the flip-flop 12, depending on what kind of signal should be prepared.

In the arrangement illustrated in FIG. 6, whether or not an input signal becomes an active signal to the flip-flop 12 is controlled in accordance with a selector circuit control signal CTR or a display enable signal DE. This causes the VSYNC synchronization signal generating circuit 5 and the HSYNC synchronization signal generating circuit 6 to operate in a desired period so as to generate control signals. However, the present embodiment is not limited to this. With the use of a selector circuit control signal CTR or a display enable signal DE as a reset signal for the flip-flop, it is possible to cause the VSYNC synchronization signal generating circuit 5 and the HSYNC synchronization signal generating circuit 6 to operate in a desired period so as to generate control signals. For example, when the flip-flop is reset in a period except the desired period by a signal level of the selector circuit control signal CTR or the display enable signal DE obtained during the desired period, it is also possible to cause an output signal of the flip-flop to become inactive during the period except the desired period. Alternatively, it is also possible to cause the VSYNC synchronization signal generating circuit 5 and the HSYNC synchronization signal generating circuit 6 to operate in a desired period so as to generate control signals, by controlling whether or not an output signal of the flip-flop becomes active in accordance with an output signal of the flip-flop and a selector circuit control signal CTR or a display enable signal DE which are combined by a logical circuit.

The above descriptions have dealt with the present embodiment.

Note that it is possible to suitably manufacture, with the use of CG silicon or polycrystalline silicon, the control circuit 37, the timing signal generating circuit 28, the power supply circuit 39, and the display panel 32 of the present embodiment. In the present embodiment, a display apparatus is described as a liquid crystal display apparatus. However, the present embodiment is not limited to this. Needless to say, the present embodiment is widely applicable to various types of display apparatuses. Furthermore, the counter circuit and the control signal generating circuit are not applied only to a display apparatus, but also to any kinds of apparatus.

A control signal generating circuit of the present invention may include the counter circuit wherein a control signal is generated which controls driving of image display of a display apparatus by use of an output signal of the counter circuit.

According to the invention, it is possible to realize a reduction in size of a circuit for generating a control signal for controlling the driving of an apparatus.

The control signal generating circuit of the present invention may include generating circuits for generating the control signal by use of the output signal of the counter circuit, said generating circuits being provided in accordance with a type of the pulse signal which is to be selected and supplied to the counter by the selector circuit.

According to the invention, each generating circuit can generate a control signal being in accordance with a type of the pulse signal which is to be selected and supplied to the counter by the selector circuit.

The control signal generating circuit of the present invention may include a trigger pulse generating circuit for generating a trigger pulse signal by use of predetermined ones of output signals of bits of the counter circuit, the control signal being generated by use of the trigger pulse signal generated by the trigger pulse generating circuit.

According to the invention, a trigger pulse signal is generated based on predetermined ones of the output signals of the bits in the counter circuit. Therefore, obtained is a trigger pulse signal to be outputted at a cycle which is in accordance with the output signals of the bits used. This allows the control signal generating circuit to generate a control signal in accordance with the cycle. As a result, various control signals can be easily generated.

The control signal generating circuit of the present invention may include a NAND circuit to which the predetermined ones of the output signals of bits of the counter in the counter circuit are supplied as all the input; and an output signal of the NAND circuit or its logically inverted signal may be used as the trigger pulse signal.

According to the invention, the NAND circuit outputs a signal having a Low level only when all the bits which are selected as supply signals have a High level. Such a signal of the NAND circuit is used as a trigger pulse signal of Low level or its logically inverted signal which is used as a trigger pulse signal of High level. As a result, it is easily change an interval between trigger pulse signals in accordance with the kinds of output signals of the bits which are selected and supplied to the NAND circuit. As a result, the trigger pulse generating circuit can be easily realized.

The control signal generating circuit of the present invention may include generating circuits for generating the control signal by use of the trigger pulse signal generated by the trigger pulse generating circuit, said generating circuits being provided in accordance with a type of the pulse signal which is to be selected and supplied to the counter by the selector circuit.

According to the generating circuit of the invention, it is possible to ensure the effect of generating control signals being in accordance with a type of the pulse signal which is to be selected and supplied to the counter by the selector circuit.

In the control signal generating circuit of the present invention, each of the generating circuits may include: a two-input NAND circuit which receives the trigger pulse signal and a signal indicating that the selector circuit selects a pulse signal which is to be supplied to the counter and which has a type corresponding to a respective one of the generating circuits; and a flip-flop that receives an output signal of the NAND circuit.

According to the invention, in each generating circuit, an active signal can be supplied from the NAND circuit to the flip-flop only in response to a trigger pulse signal when the selector circuit selects a pulse signal which is to be supplied to the counter and which has a type corresponding to a respective one of the generating circuits. As a result, it is possible to cause each generating circuit to operate in a desired period.

In the present invention, the apparatus may be a display apparatus; and the plurality of pulse signals may include a signal having a vertical cycle for image display; and a signal having a horizontal cycle for image display.

According to the invention, a signal having a vertical cycle for image display and a signal having a horizontal cycle for image display are used as pulse signals that share the counter, so that a control signal to control the driving of the display apparatus is generated. A vertical cycle is much longer than a horizontal cycle. When it is intended to generate (i) a control signal which is in sync with a signal having a vertical cycle and (ii) a control signal which is in sync with a signal having a horizontal cycle, based on a counted result which is obtained when a single counter counts a single input pulse signal, i.e., only the signal having the horizontal cycle, a counter having great many bits for counting vertical cycles is necessary. In contrast, in the present invention, an input pulse signal is divided into a signal having a vertical cycle for image display and a signal having a horizontal cycle for image display. This gives rise to the effect of avoiding an increase in the number of bits of the counter.

In the control signal generating circuit of the present invention, during a power-up period of the apparatus, the selector circuit of the counter circuit may select, from among the plurality of pulse signals, the signal having a vertical cycle for image display, and supply the signal thus selected to the counter; and, during a display period of the apparatus, the selector circuit of the counter circuit may select, from among the plurality of pulse signals, the signal having a horizontal cycle for image display, and supply the signal thus selected to the counter.

According to the invention, during a power-up period, a control signal being in sync with a signal having a vertical cycle for image display can be generated whereas, during a display period, a control signal being in sync with a signal having a horizontal cycle for image display can be generated.

A display apparatus of the present invention may include the control signal generating circuit and generate a control signal for controlling driving of an apparatus including the counter circuit by use of an output signal of the counter circuit.

According to the invention, driving of the display apparatus is controlled in accordance with a control signal generated by the control signal generating circuit. This allows a space other than the control signal generating circuit of the display apparatus to be largely secured.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The present invention is suitably applicable to a liquid crystal display apparatus.

The invention claimed is:

1. A control signal generating circuit comprising:

a counter circuit including, a counter configured to count a number of pulses in a pulse signal during a display period, and a selector circuit configured to select the pulse signal from among a plurality of pulse signals based on a selection signal and supply the pulse signal to the counter;

a plurality of synchronization signal generating circuits, each synchronization signal generating circuit configured to generate a control signal according to an output signal of the counter circuit and the selection signal; and a trigger pulse generating circuit configured to generate a trigger pulse signal by use of one or more bits of the output signal of the counter circuit, wherein the control signal is generated by use of the trigger pulse signal generated by the trigger pulse generating circuit, the plurality of synchronization signal generating circuits are configured to generate the control signal according to the trigger pulse signal and the selection signal, wherein the selection signal indicates a type of the pulse signal which is to be selected and supplied to the counter by the selector circuit, and each of the plurality of synchronization signal generating circuits includes:

a two-input NAND circuit configured to receive the trigger pulse signal and a signal indicating that the selector circuit selects a pulse signal which is to be supplied to the counter and which has a type corresponding to a respective one of the plurality of synchronization generating circuits; and a flip-flop configured to receive an output signal of the NAND circuit.

2. The control signal generating circuit as set forth in claim 1, wherein:

the trigger pulse generating circuit includes a NAND circuit configured to receive the one or more bits of the output signal the counter circuit and output the trigger pulse signal as either the output of the NAND circuit or a logically inverted signal of the NAND circuit.

3. The control signal generating circuit as set forth in claim 1, wherein:

the apparatus is a display apparatus; and the plurality of pulse signals includes:

a signal having a vertical cycle for image display; and a signal having a horizontal cycle for image display.

4. The control signal generating circuit as set forth in claim 3, wherein:

during a power-up period of the apparatus, the selector circuit of the counter circuit is configured to select, from among the plurality of pulse signals, the signal having a vertical cycle for image display, and supply the signal thus selected to the counter; and during a display period of the apparatus, the selector circuit of the counter circuit is configured to select, from among the plurality of pulse signals, the signal having a horizontal cycle for image display, and supply the signal thus selected to the counter.

5. A display apparatus comprising a control signal generating circuit as set forth in claim 1, wherein driving of image display is carried out in accordance with the control signal generated by the control signal generating circuit.

* * * * *